United States Patent
Miller

(10) Patent No.: US 9,514,361 B2
(45) Date of Patent: Dec. 6, 2016

(54) CLASSIFICATION OF RANGE PROFILES

(75) Inventor: Robert James Miller, Essex (GB)

(73) Assignee: BAE SYSTEMS plc, London (GB)

( * ) Notice: Subject to any disclaimer, the term of this patent is extended or adjusted under 35 U.S.C. 154(b) by 697 days.

(21) Appl. No.: 13/642,386

(22) PCT Filed: Apr. 18, 2011

(86) PCT No.: PCT/GB2011/050761
§ 371 (c)(1),
(2), (4) Date: Oct. 19, 2012

(87) PCT Pub. No.: WO2011/131973
PCT Pub. Date: Oct. 27, 2011

(65) Prior Publication Data
US 2013/0041640 A1 Feb. 14, 2013

(30) Foreign Application Priority Data

Apr. 21, 2010 (EP) .................................. 10250803
Apr. 21, 2010 (GB) .................................. 1006629.8

(51) Int. Cl.
*G06F 7/60* (2006.01)
*G06F 17/10* (2006.01)
(Continued)

(52) U.S. Cl.
CPC ............. *G06K 9/00543* (2013.01); *G01S 7/41* (2013.01); *G06K 9/3241* (2013.01)

(58) Field of Classification Search
CPC ...... G01S 7/41; G06K 9/3241; G06K 9/00543
(Continued)

(56) References Cited

U.S. PATENT DOCUMENTS 5,528,234 A     6/1996   Mani et al.
7,692,573 B1 *  4/2010   Funk .............................. 342/90
(Continued)

OTHER PUBLICATIONS

DeWitt. "High Range Resolution Radar Target Identification Using the Prony Model and Hidden Markov Models". Nov. 1992. Accession No. ADA259210. 130 Pages.*
(Continued)

*Primary Examiner* — Eunhee Kim
(74) *Attorney, Agent, or Firm* — Finch & Maloney PLLC

(57) ABSTRACT

A method and apparatus are provided for classifying range profiles, generated for example by a radar, lidar or sonar. In the method, each in a set of objects of interest is modeled with a probabilistic model. The probabilistic model represents the probabilities of occurrence of different possible sequences of distances between selected features of the object, in different orientations, that are likely to result in peaks of backscatter in a range profile of the object. The probabilistic model is derived from a first probabilistic representation of each selected feature, generated to represent the uncertainty in locating the feature and the uncertainty in observing the feature in a range profile. Classification is achieved by calculating, for each probabilistic model, the probability that the model would generate a given sequence of distances between observed backscatter events in a given range profile. The model generating the given sequence with the greatest probability identifies the object likely to have produced the given range profile. Preferably, the probabilistic models comprise Hidden Markov Models (HMMs).

20 Claims, 2 Drawing Sheets

Figure 1A:
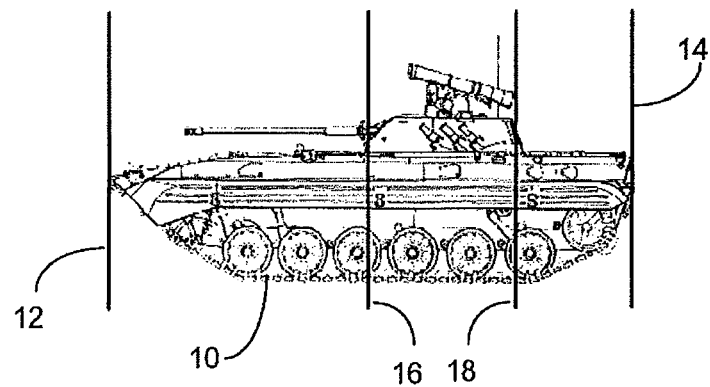

(51) Int. Cl.
*G06K 9/00* (2006.01)
*G01S 7/41* (2006.01)
*G06K 9/32* (2006.01)

(58) Field of Classification Search
USPC .......................................................... 703/2
See application file for complete search history.

(56) References Cited

U.S. PATENT DOCUMENTS

| | | | |
|---|---|---|---|
| 8,111,873 B2* | 2/2012 | Berthilsson et al. | 382/103 |
| 2003/0164792 A1* | 9/2003 | Jahangir et al. | 342/90 |
| 2006/0187305 A1* | 8/2006 | Trivedi | G06K 9/00234 348/169 |
| 2006/0284761 A1* | 12/2006 | Picard | 342/160 |
| 2011/0131016 A1* | 6/2011 | Stolper | G06F 17/30259 703/1 |

OTHER PUBLICATIONS

International Preliminary Report on Patentability and Written Opinion regarding PCT/GB2011/050761, mailed Nov. 1, 2012, 8 pages.
United Kingdom Search Report regarding Application No. GB1006629.8, dated Aug. 19, 2010, 3 pages.
European Search Report regarding Application No. EP10250803.3, dated Oct. 1, 2010, 8 pages.
Bingnan Pei et al. "Radar Target Recognition Based on Peak Location of HHR Profile and HMMS Classifiers," Radar, Oct. 15-17, 2002, 5 pages.
Richard A Mitchell, et al. "Robust Statistical Feature Based Aircraft Identification," IEEE Transactions on Aerospace and Electronic Systems, vol. 35, No. 3, Jul. 1, 1999, 18 pages.
Rabiner L.R. "A Tutorial on Hidden Markov Models and Selected Applications in Speech Recognition," 8078 Proceedings of the IEEE 77, Feb. 1989, 28 pages.
Zhou D et al. "Spatio-temporal target identification method of high-range resolution radar," Pattern Recognition, vol. 33, No. 1, Issue, Jan. 1, 2000, pp. 1-7, Abstract.
Miller, R.J. et al. "Advances in Radar NCTR Using Non-Radar Referents," 2nd EMRS DTC Technical Conference, Edinburgh 2005, 6 pages.
Miller, Robert et al. "Aspects of NCTR for Near-Future Radar", RTO SET Symposium on Target Identification and Recognition Using RF Systems, Oslo, Norway, Oct. 11-13, 2004, 3 pages.
Miller, R.J et al. "Model-Based Aircraft Recognition," Radar Symposium, May 24-26, 2006, 4 pages.
Miller, R.J. et al. Progress in Radar Recognition of Aircraft Without Using Radar-Derived Databases, 1st EMRS DTC Technical Conference—Edinburgh 2004, 6 pages.
Miller, R.J. "Radar NCTR Using Non-Radar Referents," 3rd EMRS DTC Technical Conference, Edinburgh 2006, 4pages.

* cited by examiner

CLASSIFICATION OF RANGE PROFILES

CROSS-REFERENCE TO RELATED APPLICATIONS

This application is a U.S. National Stage application under 35 USC §371of PCT/GB2011/050761 filed 18 Apr. 2011, which claims priority under the Paris Convention to European Application 10250803.3 filed 21 Apr. 2010, and British Application 1006629.8 filed 21 Apr. 2010, the entire contents of each of these applications being incorporated herein by reference.

This invention relates to the classification of objects using range profiles and in particular, but not exclusively, to the recognition of objects based upon models representing potential range profiles for those objects.

It is known to use high resolution range profiles to distinguish between different types of object, e.g. aircraft. The most common approach has been to use statistical classifiers which require training with extensive measurements of all objects of interest from all viewpoints. These data are used to train a classifier. However, obtaining the required training data is a significant barrier to the practical application of techniques using this approach.

An alternative known approach which avoids the necessity of making large numbers of sensor measurements beforehand, begins by determining the locations of physically identifiable features on an object which are known to or are likely to give rise to distinct features in a range profile, such as bright peaks in backscatter or features due to shadowing. These locations may be determined for example using engineering schematics, photographs or scale models, for example.

Once such features have been identified from data other than direct sensor measurements, a form of scattering model may be constructed for each object of interest. These models primarily indicate the location of features in a detected range profile but not their amplitudes. To classify newly-observed range profiles, the locations of the features are extracted from the profile by appropriate signal processing, then their positions are compared with those indicated by each model, and the profile is classified according to the closest match.

Comparison between the locations of the extracted features and those predicted by the model is challenging since it is often the case that some predicted features are not always observed and some features may be observed which are not predicted by the model. An approach which alleviates these difficulties is needed.

From a first aspect, the present invention resides in a method for classifying range profiles, comprising:

(i) generating, for each in a set of objects of interest, a probabilistic model representing, for one or more different orientations of the object, possible sequences of distances between features of the object selected as being likely to result in distinct peaks in range data for the object, wherein the possible sequences of distances are derived from a first probabilistic representation of each said selected feature; and (ii) classifying a given range profile by deriving an observed sequence of distances from the spacing of distinct peaks in the given range profile and by calculating, for each of one or more probabilistic models generated at step (i), the probability that the model generates the observed sequence of distances, the object whose model generates the observed sequence with the greatest probability being associated with the given range profile.

Thus, according to the present invention, a first probabilistic representation is generated to represent particular features of each object of interest. This first probabilistic representation will be referred to in the specific description that follows as a "primary signature model". From this first probabilistic representation of features a probabilistic model is generated for each object. The probabilistic model will be referred to as the "secondary probabilistic model" in the specific description that follows. The probabilistic models serves as the basis for subsequent classification of range profiles.

Thus, in a preferred embodiment of the present invention, in step (i) of the method, generating the probabilistic model comprises the steps of:

(a) generating a first probabilistic representation defining the uncertainty in locating of each of the selected features of the object and the uncertainty in whether or not each of the features is observed;

(b) deriving, for one or more orientations of the object, inferred sequences of the features which may be observable as distinct peaks in range data for the object, and the possible sequences of distances between the features in each inferred sequence; and (c) generating, from the first probabilistic representation and the possible sequences of distances, a probabilistic model for the object from which the probability may be calculated that an observed sequence of distances corresponds to a possible sequence derived from the first probabilistic representation.

The first probabilistic representation of features may be constructed directly from a knowledge of the physical properties of the object, derived for example through an analysis of engineering drawings, photographs, or other sources of information about the object. Sequences of observable features, and the corresponding sequences of distances between them, are inferred from the first probabilistic representation. A secondary probabilistic representation of the object is then generated in the form of a probabilistic model, referred to below as the "secondary probabilistic model", from which it is possible to calculate the probability that any given sequence of distances may be generated by the probabilistic model.

In a further preferred embodiment, at step (i) in the method, the probabilistic model for the object comprises a set of one or more Hidden Markov Models (HMM), each HMM defining, for a different orientation of the object, probabilities for the possible sequences of distances between the selected features of the object.

The inventors in the present case have identified that HMMs may be used to implement the probabilistic model with a number of advantages. Known techniques associated with HMMs may be applied to calculate the occurrence probability of a sequence of distances in a given range profile from each of the HMM-based probabilistic models.

A particular advantage of preferred embodiments of the present invention is that HMMs are well-suited to problems where features may not be reliably observed so that, associated with any particular feature, there is generally a less than 100% probability of observation and features may be missed, i.e. where they are not reliably detected—a significant problem with range profile measurements. They are also tolerant of the occurrence of additional observed features which may not have been represented in the primary signature model. Both of these properties are highly desirable in the context of recognition systems based on the use of range profiles. HMMs are generated for each type of object of interest at aspect angles appropriate to the orientation of the object. If there is some uncertainty in the object orientation, HMMs may be generated over a range of aspect angles.

Once the probabilistic model is in the form of an HMM, standard techniques may be used to compare HMMs for each object of interest with a feature set derived from a newly-measured profile. For each model, a probability is computed that the observed feature set derives from the probabilistic model and the measured profile is then classified according to which probabilistic model, and hence which object, yields the highest probability. The ability to use the HMM in this context allows a consistent comparison to be made with clearly-formulated probabilistic models of object features.

The probability of occurrence of a given sequence from several different primary models may be compared and applied to classify the origin of the sequence and hence the identity of the object from amongst the objects modelled in the primary signature model.

In a preferred embodiment, step (ii) in the method further comprises estimating the orientation of an object represented in the given range profile and wherein the one or more probabilistic models comprise HMMs generated for objects having substantially the estimated orientation. The orientation may be estimated using known techniques based upon a sequence of observations of the object. This helps to reduce the number of calculations that need to be made, enabling only a subset of the available probabilistic models to be assessed.

A further advantageous feature of the probabilistic models defined according to the present invention is that they may be used to generate profile data for use in testing and performance analysis of classifiers. Thus, in a further preferred embodiment, the method further comprises the step of:

(iii) generating a plurality of examples of a range profile for one or more of the objects of interest from their respective HMMs and using a simulation technique to generate classification results for a particular set of HMMs so as to predict the potential performance of a classifier.

From a second aspect, the present invention resides in an apparatus for classifying range profiles, comprising:

an input for receiving a range profile to be classified;
a store for storing, for each of one or more objects of interest, a probabilistic model derived from a first probabilistic representation of features of the object selected as being likely to result in distinct peaks in range data for the object; and
classifying means for deriving a sequence of distances from the spacing of distinct peaks in a received range profile, for calculating, for the received range profile and for each of one or more probabilistic models stored in the store, the probability that the stored probabilistic model generates the derived sequence of distances, and for associating the received range profile with an object from said one or more objects of interest whose probabilistic model generates the derived sequence with the highest probability.

Preferably, the probabilistic model comprises a set of one or more HMMs, each defining, for a different orientation of the object, probabilities for the possible sequences of distances between said selected features of the object.

From a third aspect, the present invention resides in a computer program which, when loaded onto a general purpose computer and executed, implements the method from the first aspect, defined above.

Application of the present invention is to any class of object where range profiles may reasonably be expected to allow discrimination amongst different object types. Thus, for example, the technique is expected to be applicable to classification of land vehicles, aircraft and ships.

Range profiles may be derived from a variety of different types of sensor, for example radar, sonar and lidar. For each of the different types of sensor, features of an object will be represented by so-called "peaks" in the signals output by the sensor, representing for example points of bright backscatter detected by the sensor. However, it will be apparent that such "peaks" may represent not only points of high signal strength, but also points of low signal strength in sensor outputs, for example where shadows cause a drop in the optical power output by a lidar optical sensor, being nevertheless representative of the position of a detectable feature of the object.

Thus, the problems addressed by adopting the method according to the present invention include:

1) explicit consideration of features observed with less than 100% probability with an expected improvement in classification performance;

2) tolerance to observation of features not represented by the model which may be due to noise or to unrecognised object properties.

Preferred embodiments of the present invention will now be described in more detail, by way of example only and with reference to the accompanying drawings, of which:

FIG. 1 provides two views of a typical vehicle of interest indicating the relative location of features suitable for representation in a primary signature model of the vehicle according to preferred embodiments of the present invention;

FIG. 2 shows the principal steps in generating a secondary probabilistic model for an object and for performing classification of a given range profile using the generated model, according to the present invention.

In preferred embodiments of the present invention a framework is provided by which objects such as land vehicles or aircraft of various types may be identified from high resolution range profiles. This framework is based upon an explicit probabilistic model, referred to as a primary signature model, the inference of sequences of observations which may arise from this model, and their representation in a secondary probabilistic model from which the probability of occurrence of each possible sequence may be calculated for a number of different orientations of the respective object. The probability of occurrence of a given sequence from several different models may be compared and applied to classify the origin of the sequence of observations in a given range profile.

Firstly, to provide an example of the types of features that may give rise to sequences of observations in a range profile, a diagram is provided in FIG. 1 of a typical land vehicle of potential interest.

Figure 1B:
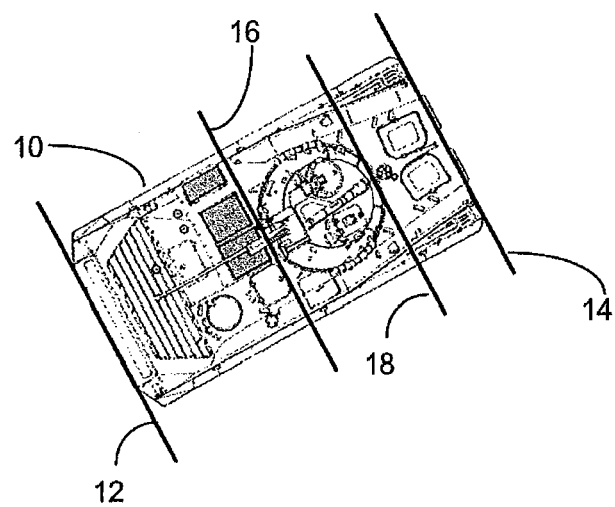

Referring initially to FIG. 1a, a land vehicle 10 is shown in side profile. FIG. 1a shows the locations of a set of features of the vehicle 10 that are either known or likely to result in regions of bright backscatter in a range profile of the vehicle 10. The locations of those features are indicated by a series of parallel lines 12, 14, 16 and 18 aligned with the nose, tail, front of turret and rear of turret, respectively. Referring to FIG. 1b, a plan view is provided of the vehicle 10 with the same features indicated from that orientation. It will be clear that the direction from which the vehicle 10 is observed will alter the perceived distances between the observed features and the sequence of their observation. It is also clear that in some orientations, not represented in FIG. 1, certain features may not be observable in a range profile at all. Such variations are taken into account in the probabilistic modelling and classification process according to the present invention, as will now be described.

A preferred process for generating the primary signature and secondary probabilistic models for an object such as the vehicle 10 of FIG. 1, the process of classification of a given range profile and the recognition of an object, e.g. the vehicle 10, from its range profile, will now be described with reference to the flow chart shown in FIG. 2. This process may be applied to the modelling of land vehicles or any type of object having a number of features likely to provide prominent peaks of backscatter in range profiles and by which the object may subsequently be recognised, according to the present invention.

Referring to FIG. 2, the preferred process comprises three stages leading to classification of a range profile—namely: at 200, for each object of interest, the generation of a primary signature model of features that may be observed in range profiles of the object; at 205 the derivation of possible sequences of features and the probabilities that they may be observed in range profiles for each of the objects of interest in different orientations and hence a secondary probabilistic model for each object; and, at 210, the steps in classification of an observed range profile as belonging to a particular object from amongst those modelled.

Figures 2A, 2B, 2C:
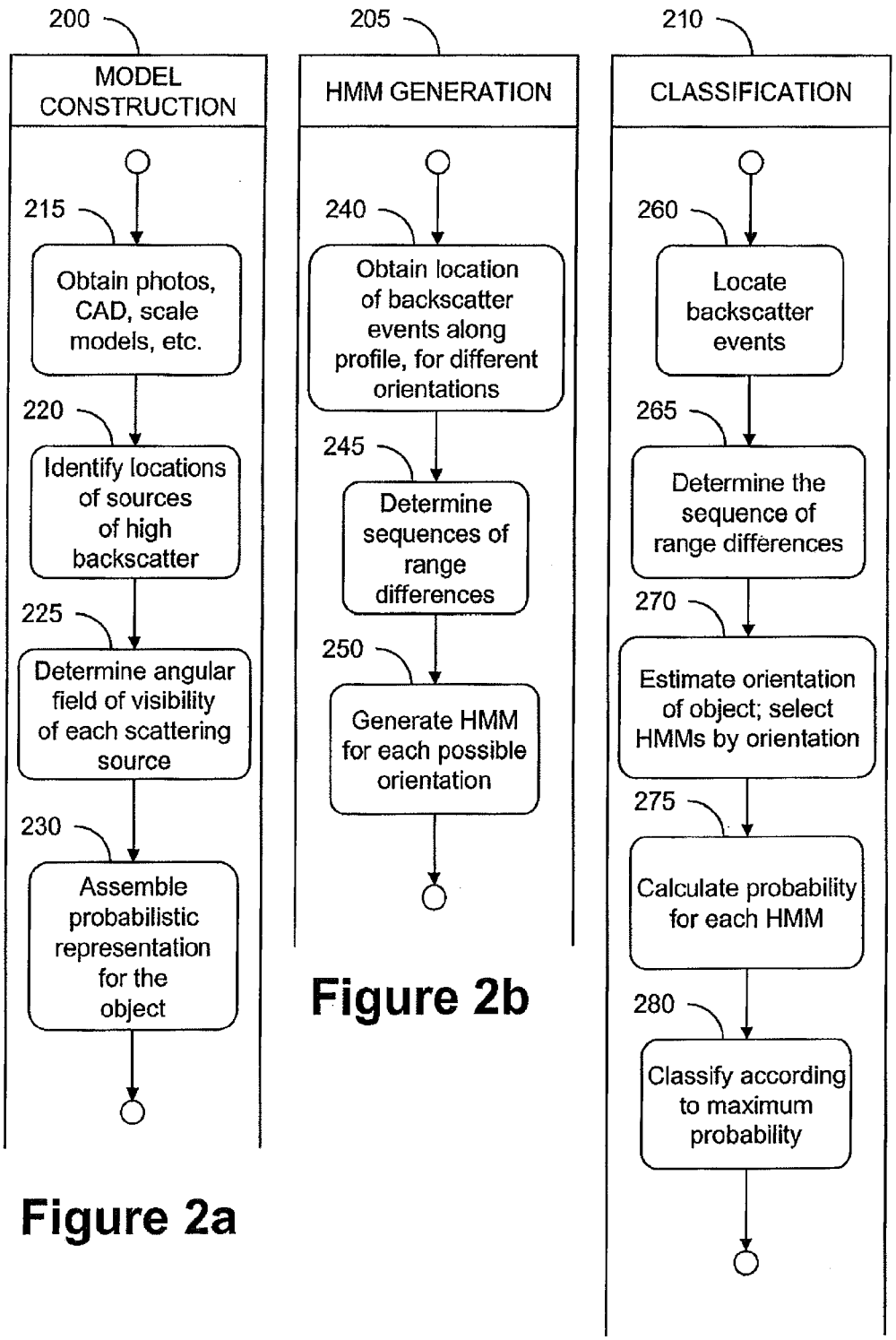

Referring initially to FIG. 2a, the generation of a primary signature model (200) for an object begins at STEP 215 with the gathering of sources of information giving structural details and preferably dimensions of the object (assuming the object itself is not available for study). Such sources may include engineering drawings, photographs and scale models of the object, as discussed above. At STEP 220, study of such indirect sources of information enables features to be selected that are likely to appear most prominently as peaks of backscatter in actual range profiles of the object when viewed in different orientations. Having selected a set of features for the particular object, their locations $\{x_0, x_1, \ldots, x_n\}$ are determined as linear distances from a reference point, preferably the location $x_0$ of the leading feature of the object in a given orientation. At STEP 225, the angular field of visibility of each selected feature is also determined and recorded.

The location of each selected feature is subject not only to a location error but also to imperfect detection by a sensor. The location errors are modelled preferably by mutually independent Gaussian random variables with standard deviation $\sigma$. An estimation of the value of $\sigma$ is based preferably on prior experience of observations from a relevant sensor. Different types of sensor are able to create range profiles for an object with differing degrees of resolution. Therefore, at STEP 230, a primary signature model for the object may be assembled by modelling each of the selected features as being observed with detection probability $p_d$. An estimation of the value of $p_d$ is again based preferably on prior experience of observations from the relevant sensor. The primary signature model may be readily generalised to allow different values of standard deviation and detection probability for each feature location, as would be apparent to a person of ordinary skill in this field.

For a given object type, the principal information available regarding the location of observable features is their location relative to some fixed point on the object. In the primary signature model (200) it is therefore necessary to consider a derived feature set which may consist, for example, of the set of consecutive differences in the location of observable features along the length of the object. In generating the primary signature model, account is taken not only of the probabilities of each feature being observed, but also the potential orientations of the object. Thus, at a given orientation, if features occur at locations $\{x_0, x_1, x_2, x_3\}$, then the sequence of differences $\{x_1-x_0, x_2-x_1, x_3-x_2\}$ may be generated.

The sequence of observables generated by the differences is only one way of generating a sequence from the primary signature model; there are many alternative possibilities such as the sequence $\{x_1-x_0, x_2-x_0, x_3-x_0\}$. The present invention is intended to include all possible ways of constructing a sequence whose probability of occurrence may be calculated from a probabilistic model for the object. In a preferred form of primary signature model, generated at STEP 230, feature pairs may be specified by a pair of indices (j, k) where k>j and k may have any value ≤n, where n is the number of features, since individual features are not always detected in a given range profile. The probability of occurrence of the different feature pairs defined according to the primary signature model and the distribution of the differences in their location is considered below and forms the basis for a preferred classification technique for range profiles represented according to this model.

Referring to FIG. 2b, a secondary probabilistic model is generated (205) for each object of interest, comprising one or more Hidden Markov Models (HMM) each representing possible pairings of features that may be detected in a given range profile along the object at a particular orientation. An HMM consists of a number of states, say N, with an associated set of transition probabilities from any state to another, denoted by A, where A is an N×N matrix. In any of the N states, any of a set of M symbols may be produced in a random fashion according to probabilities specified in an N×M matrix B. An HMM generates a sequence of symbols by starting in some state, generating a symbol in that state, transitioning to another state, generating a further symbol and so on. The states are never directly observed; only the symbols generated in a given state—hence the "hidden" nature of this form of model.

To apply an HMM to the classification of features defined according to the primary signature model outlined above, an HMM is required which is capable of representing the differences in location of successive features on an object, since only these differences in location are observable in range profiles. Thus, at STEP 240 in FIG. 2b, the possible locations of observable features, in the form of backscatter events in a range profile, are determined for each of a number of different possible orientations of the object. An HMM-based model is proposed in which each state represents the occurrence of a successive pair of features. Thus, for example, if an object has three features labelled 1, 2 and 3, then the possible successive pairs are (1,2), (1,3), (2,3). The possible sequences of distances for the features modelled in the primary signature model are determined at STEP 245. In general, if there are m features then there are $M=\frac{1}{2}m(m-1)$ possible successive pairs and thus of distances between pairs. These pairs may be labelled by an index q given by the following relationship:

$$q(j, k, m) = k + (j-1)m - \tfrac{1}{2}j(j+1) \qquad 1)$$

The relationship (1) enables feature pairs to be mapped, at STEP 250, to particular states in an HMM.

If each feature is observed with a probability $p_d$ then the probability that the first pair observed is (j, k) is given as follows. The probability that the initial feature observed is j is $(1-p_d)^{j-1}p_d$; the probability that the next feature observed is k is $(1-p_d)^{k-j-1}p_d$; thus the overall probability that the first pair observed is (j, k) is given by:

$$\pi((j, k)) = p_d^2 (1-p_d)^{k-2} \qquad 2)$$

The probability of making a transition from state $q_1$ to state $q_2$ is zero unless the trailing feature of $q_1=(j_1, k_1)$ is identical to the leading feature of $q_2=(j_2, k_2)$. The transition probability is then the probability that the feature $k_2$ is observed directly after the feature $k_1$, i.e. $(1-p_d)^{k_2-k_1-1}p_d$. The net transition probability is therefore given by:

$$\tau((j_1, k_1), (j_2, k_2)) = p_d(1-p_d)^{k_2-k_1-1}\delta_{j_2 k_1} \quad \quad 3)$$

As mentioned above, measurement of the location of features is subject to measurement error. Therefore, in any particular state, a random variable is generated which represents the difference in location of the two features with random variation due to measurement error. Let the measurement error for the location of each feature be identical and given by $\sigma$ and let the location of each feature be given by $x_j$; then a random variable $\delta$ generated for state $q=(j, k)$ is normally distributed as follows ($N(\mu, \sigma^2)$ represents a normally-distributed random variable with mean $\mu$ and variance $\sigma^2$):

$$\delta_q = \delta_{(j, k)} \sim N(x_k-x_j, 2\sigma^2) \quad \quad 4)$$

The random variables generated by an HMM in different states are independent, so there is no correlation between them; thus, for $q_1 \neq q_2$:

$$\text{cov}(\delta_{q_1}, \delta_{q_2}) = 0 \quad \quad 5)$$

Here, $\text{cov}(x, y) = E(xy) - E(x)E(y)$ for any two random variables and $E(\ )$ is expected value.

Considering the primary signature model outlined above, it is observed that location differences may actually be correlated or, more precisely, anti-correlated. Considering adjacent pairs $(j_1, k_1)$ and $(j_2, k_2)$ such that $j_2=k_1$; then, because of the common random variable $x_{k_1}=x_{j_2}$, the covariance of the differences is given by:

$$\text{cov}(\delta_{q_1}, \delta_{q_2}) = -\sigma^2 \quad \quad 6)$$

This implies that the HMM can only be regarded as an approximation to the primary signature model. However, the HMM appears to be effective in classifying range profiles generated according to the primary model (200).

Referring to FIG. 2c, in a preferred technique (210) for classifying a given range profile, at STEP 260 the process begins by locating backscatter events in the profile and, at STEP 265, determining a sequence of distances—range differences—between successive located backscatter events in the profile. At STEP 270, an optional step is provided to estimate the orientation of an object represented by the given range profile, by means of a known technique, such that only those HMMs in the secondary probabilistic model representing objects at substantially the estimated orientation may be selected for analysis. At STEP 275, either the selected HMMs or all of the HMMs generated by the process 205 are considered in turn with the derived sequence of distances from STEP 265 to provide estimates of the probability that the observed sequences in the profile may be generated by the HMM. A technique for the calculation of such probabilities is described for example in L. R. Rabiner, "A Tutorial on Hidden Markov Models and Selected Applications in Speech Recognition", Proc. IEEE, vol. 77, no. 2, p. 257-286, February 1989. Once calculated, the probabilities in respect of each HMM are compared, at STEP 280, and the given range profile is classified according to which of the HMMs may generate the observed sequence with the greatest probability.

In addition to classification, HMMs may also be used to generate examples of profiles from models, so that, for a given set of models, Monte Carlo simulation may be used to generate classification results for a particular set of models. The ability to predict potential performance from a set of models without use of measurements is a highly valuable property which may be used to assist in defining how the classifier is applied.

HMMs are a particular type of probabilistic graphical model which may be expressed as a mathematical graph denoting the conditional dependence amongst a set of random variables. More general graphical models may be applied to achieve classification of objects within the scope of the present invention, as would be apparent to a person of ordinary skill in the relevant art.

The invention claimed is:

1. A method for classifying range profiles, comprising:
   gathering non-sensor based sources of information giving structural details of objects of interest;
   selecting, from the non-sensor based sources of information, features of the objects of interest that are configured to appear most prominent as peaks of backscatter in a sensor based observation of the objects of interest;
   generating, for each of the objects of interest, a probabilistic model representing, for one or more different orientations of the respective object of interest, possible sequences of distances between the features of the respective object of interest selected from the non-sensor based sources of information that are configured to appear as distinct peaks of backscatter in sensor based range data for the object, wherein the possible sequences of distances are derived from a first probabilistic representation of each of the features of the respective object of interest;
   classifying a given sensor based range profile by deriving an observed sequence of distances from the spacing of distinct peaks of backscatter in the given sensor based range profile and by calculating, for each of the probabilistic models, a probability that the respective probabilistic model represents the observed sequence of distances, wherein the object of interest represented by the probabilistic model that represents the observed sequence of distances with the greatest probability is associated with the given sensor based range profile; and
   generating classification results for at least one of the probabilistic models so as to predict the potential performance of a classifier.

2. The method of claim 1 wherein generating the probabilistic model comprises:
   generating a first probabilistic representation defining an uncertainty in locating each of the features of the respective object of interest selected from the non-sensor based sources of information and an uncertainty in whether or not each said feature is observed;
   deriving, for one or more orientations of the object, inferred sequences of said features which are observable as distinct peaks of backscatter in sensor based range data for the object, and the possible sequences of distances between said features in each inferred sequence; and
   generating, from the first probabilistic representation and the possible sequences of distances, a probabilistic model for the object from which the probability is calculated that an observed sequence of distances corresponds to a possible sequence derived from the first probabilistic representation.

3. The method according to claim 1, wherein the probabilistic model for the object comprises a set of one or more Hidden Markov Models (HMM), each HMM defining, for a different orientation of the object, probabilities for the possible sequences of distances between the features of the respective object of interest selected from the non-sensor based sources of information.

4. The method according to claim 3, wherein generating the probabilistic model further comprises estimating the orientation of an object represented in the given sensor based range profile, and wherein said one or more probabilistic models comprise HMMs generated for objects having said estimated orientation.

5. The method according to claim 3, further comprising: generating a plurality of examples of a range profile for one or more of said objects of interest from their respective HMMs and using a simulation technique to generate the classification results for a particular set of HMMs so as to predict the potential performance of the classifier.

6. The method according to claim 1, wherein said sensor based range data and the given sensor based range profile relate to and are generated by a high range resolution radar, and wherein said distinct peaks correspond to peaks in backscattered radiation from the object.

7. The method according to claim 1, wherein said sensor based range data and the given sensor based range profile relate to and are generated by at least one of a lidar and a sonar.

8. The method according to claim 1, wherein the non-sensor based sources of information include at least one of: engineering drawings, photographs of the objects of interest, and scale models of the objects of interest.

9. The method according to claim 1, further comprising determining locations of observable features as linear distances from a reference point to the respective observable features, wherein the distances between observable features of the object are based at least in part of the locations of the observable features.

10. The method according to claim 9, further comprising determining an angular field of visibility of each selected feature.

11. The method according to claim 9, wherein the observed sequence of distances includes a set of consecutive differences in the locations of observable features along a length of the object.

12. The method according to claim 9, wherein the observed sequence of distances includes a set of differences in the locations of observable features with respect to the reference point.

13. A non-transitory computer program product encoded with instructions that, when executed by one or more processors, causes a process to be carried out, the process comprising:
 gathering non-sensor based sources of information giving structural details of objects of interest;
 selecting, from the non-sensor based sources of information, features of the objects of interest that are configured to appear most prominent as peaks of backscatter in a sensor based observation of the objects of interest;
 generating, for each of the objects of interest, a probabilistic model representing, for one or more different orientations of the respective object of interest, possible sequences of distances between the features of the respective object of interest selected from the non-sensor based sources of information that are configured to appear as distinct peaks of backscatter in sensor based range data for the object, wherein the possible sequences of distances are derived from a first probabilistic representation of each of the features of the respective object of interest;
 classifying a given sensor based range profile by deriving an observed sequence of distances from the spacing of distinct peaks of backscatter in the given sensor based range profile and by calculating, for each of the probabilistic models, a probability that the respective probabilistic model represents the observed sequence of distances, wherein the object of interest represented by the probabilistic model that represents the observed sequence of distances with the greatest probability is associated with the given sensor based range profile; and
 generating classification results for at least one of the probabilistic models so as to predict the potential performance of a classifier.

14. The non-transitory computer program product according to claim 13, wherein the process further comprises:
 generating a first probabilistic representation defining an uncertainty in locating each of the features of the respective object of interest selected from the non-sensor based sources of information and an uncertainty in whether or not each said feature is observed;
 deriving, for one or more orientations of the object, inferred sequences of said features which are observable as distinct peaks of backscatter in sensor based range data for the object, and the possible sequences of distances between said features in each inferred sequence; and
 generating, from the first probabilistic representation and the possible sequences of distances, a probabilistic model for the object from which the probability is calculated that an observed sequence of distances corresponds to a possible sequence derived from the first probabilistic representation.

15. The non-transitory computer program product according to claim 13, wherein the probabilistic model for the object comprises a set of one or more Hidden Markov Models (HMM), each HMM defining, for a different orientation of the object, probabilities for the possible sequences of distances between the features of the respective object of interest selected from the non-sensor based sources of information.

16. The non-transitory computer program product according to claim 15, wherein generating the probabilistic model further comprises estimating the orientation of an object represented in the given sensor based range profile, and wherein said one or more probabilistic models comprise HMMs generated for objects having said estimated orientation.

17. The non-transitory computer program product according to claim 15, wherein the process further comprises:
 generating a plurality of examples of a range profile for one or more of said objects of interest from their respective HMMs and using a simulation technique to generate the classification results for a particular set of HMMs so as to predict the potential performance of the classifier.

18. The non-transitory computer program product according to claim 13, wherein said sensor based range data and the given sensor based range profile relate to and are generated by a high range resolution radar, and wherein said distinct peaks correspond to peaks in backscattered radiation from the object.

19. The non-transitory computer program product according to claim 13, wherein said sensor based range data and the given sensor based range profile relate to and are generated by at least one of a lidar and a sonar.

20. The non-transitory computer program product according to claim 13, wherein the non-sensor based sources of information include at least one of: engineering drawings, photographs of the objects of interest, and scale models of the objects of interest.

* * * * *